(12) United States Patent
Dunn

(10) Patent No.: US 6,880,944 B2
(45) Date of Patent: Apr. 19, 2005

(54) MIRROR FOR VEHICLE AND METHOD OF USE

(75) Inventor: Steven B. Dunn, Beverly Hills, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 10/370,788

(22) Filed: Feb. 20, 2003

(65) Prior Publication Data

US 2004/0165294 A1 Aug. 26, 2004

(51) Int. Cl.$^7$ ............................................... G02B 7/182
(52) U.S. Cl. ........................................................ 359/872
(58) Field of Search .................................. 359/841, 871, 359/872, 881; 248/467, 479, 480, 481, 484, 486

(56) References Cited

U.S. PATENT DOCUMENTS

| | | | |
|---|---|---|---|
| 3,828,623 A | * 8/1974 | Zillner | ..................... 74/491 |
| 3,954,328 A | 5/1976 | Ames | |
| 4,702,572 A | * 10/1987 | Cossey | ..................... 359/876 |
| 4,856,888 A | * 8/1989 | Wahl | ........................ 359/881 |
| 4,927,255 A | 5/1990 | Martinez | |
| 5,946,149 A | 8/1999 | Hoffman | |
| 6,039,455 A | * 3/2000 | Sorenson | ..................... 248/479 |
| 6,130,790 A | * 10/2000 | Tu | ............................ 359/841 |
| 6,132,051 A | 10/2000 | Morell et al. | |
| 6,354,708 B1 | 3/2002 | Monahan et al. | |
| 6,409,200 B1 | * 6/2002 | Glass | ......................... 280/477 |

* cited by examiner

Primary Examiner—Euncha P. Cherry
(74) Attorney, Agent, or Firm—Knoble Yoshida & Dunleavy, LLC

(57) ABSTRACT

A method of observing a small child in a vehicle is performed by mounting a novel mirror assembly to a portion of the vehicle. The mirror assembly includes a telescoping shaft that may be adjusted in length so as to permit the mirror assembly to be adjusted to an optimal position with which to view a small child. In addition, gripping structure is preferably provided in order to facilitate gripping of the mirror by a user during the adjustment process.

11 Claims, 2 Drawing Sheets

MIRROR FOR VEHICLE AND METHOD OF USE

BACKGROUND OF THE INVENTION

1. Field of the Invention

This invention relates to automotive accessories and, in particular, accessories for aiding a parent or other caregiver when an infant or small child is a passenger in a vehicle.

2. Description of the Related Technology

Ideally, parents or other caregivers should be able to conveniently view an infant or small child who is a passenger in a vehicle such as an automobile. The parent or caregiver should check periodically to determine whether or not the child is in a comfortable, safe position, exposed or not to direct sunlight and so forth.

A number of automotive accessories having mirrors are commercially available for this purpose. However, such accessories tend to be limited in a number of ways. Specifically, adjustability for such mirrors tends to be limited to rotational adjustment of the component members, and does not provide for longitudinal adjustment in the distance between the mounting structure and the mirror itself. As a result, it is difficult to adjust such accessories to all of the particular viewing orientations that might be necessary given the wide array of different vehicles and seating positions that are available to consumers today. In addition, the limited adjustability of such accessories largely precludes the possibility of more than one person being able to use the mirror without remounting the mirror. Additionally, many such accessories tend to require mounting of the accessories to a portion of the windshield of the vehicle that might adversely impact the driver's view.

It is clear that a need has existed for an improved mirror assembly for use in a vehicle and a method of using such an assembly that provides enhanced adjustability in comparison to those devices that have heretofore been available.

SUMMARY OF THE INVENTION

Accordingly, it is an object of the invention to provide an improved mirror assembly for use in a vehicle and a method of using such an assembly that provides enhanced adjustability with respect to those devices that have heretofore been available.

In order to achieve the above and other objects of the invention, a mirror for use in a vehicle that is constructed according to a first aspect of the invention includes a telescoping shaft having a first end and a second end, mounting structure connected to the first end of the telescoping shaft for mounting to a portion of a vehicle; and a mirror connected to the second end of the telescoping shaft.

According to a second aspect of the invention, a method of observing a small child in a vehicle includes steps of mounting a mirror assembly to a portion of a vehicle; orienting the mirror assembly to an optimal position with which to view a small child, and wherein the step of orienting the mirror assembly includes a step of making a longitudinal positional adjustment by extending or retracting a telescoping shaft of the mirror assembly; and viewing the small child as desired.

According to a third aspect of the invention, a method of observing a small child in a vehicle includes steps of mounting a mirror assembly to a portion of a vehicle that is in reach of both a driver of the vehicle and a front seat passenger; orienting the mirror assembly to an optimal position with which to view a small child; and viewing the small child as desired.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
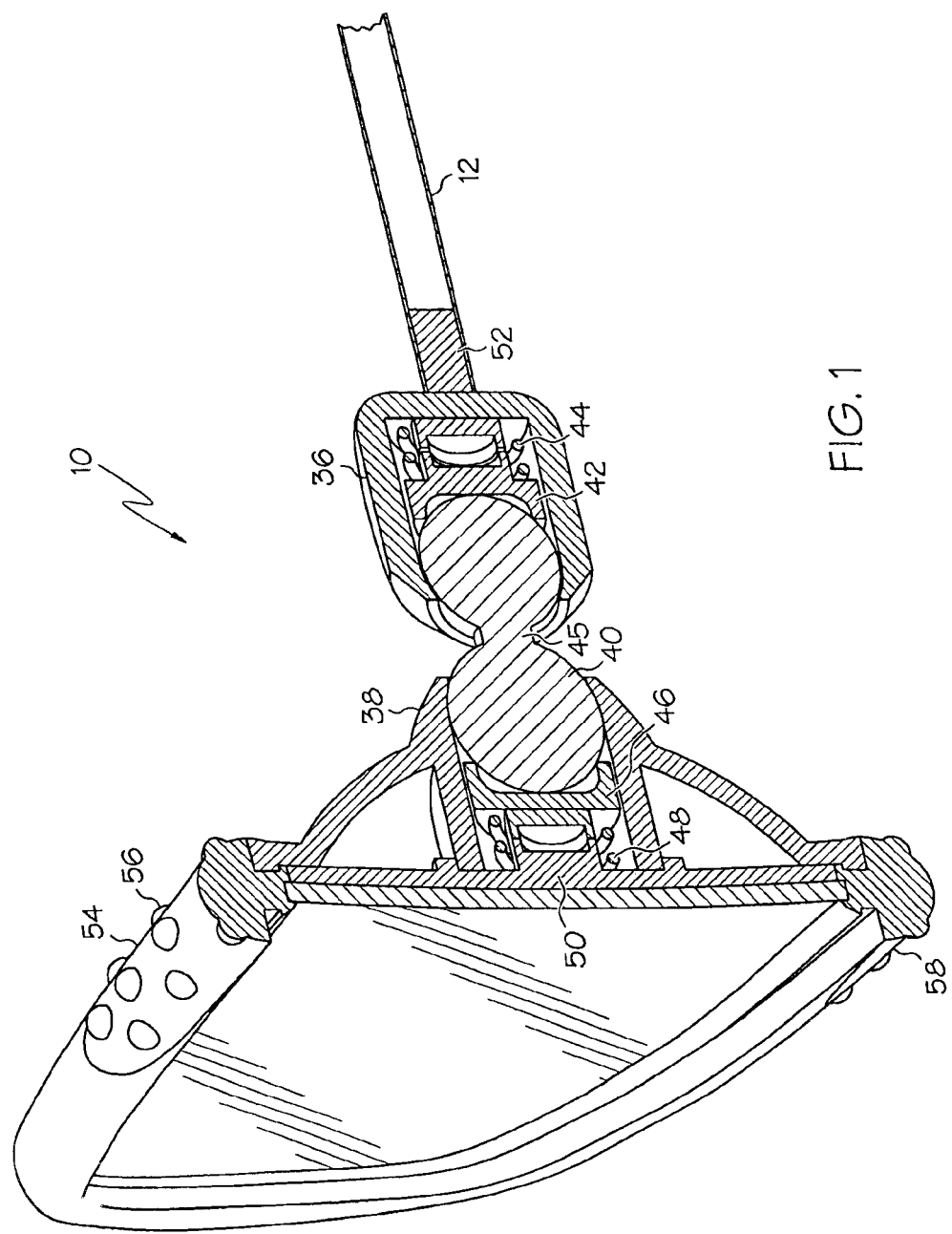
FIG. 1 is a perspective fragmentary view depicting the adjustable mirror assembly that is constructed according to a preferred embodiment of the invention.
Figure 2:
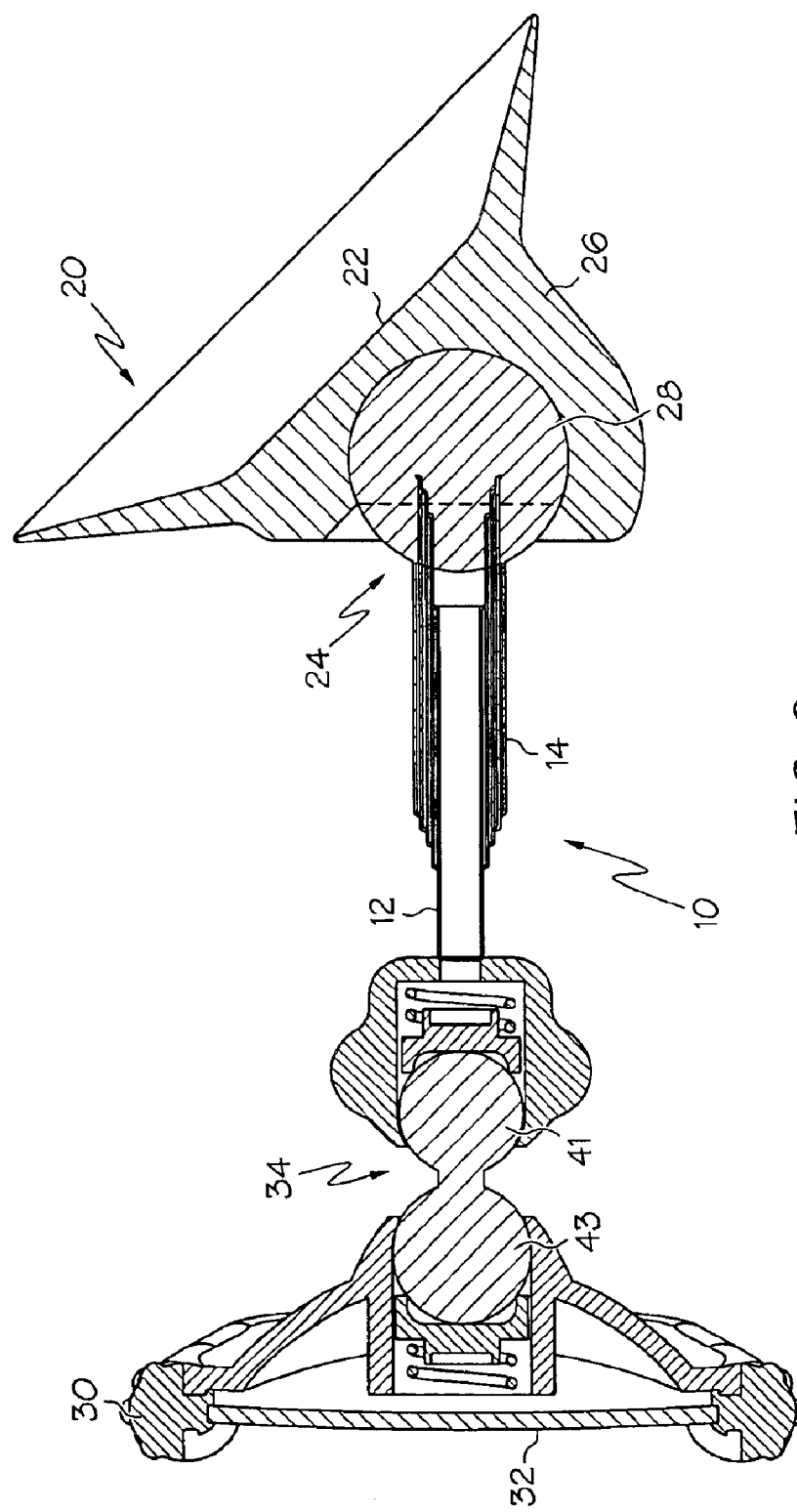
FIG. 2 is a side elevational view, taken partially in cross-section, depicting the adjustable mirror assembly that is shown in FIG. 1.

Referring now to the drawings, wherein like reference numerals designate corresponding structure throughout the views, and referring in particular to FIGS. 1 and 2, an adjustable mirror assembly 10 that is constructed according to a preferred embodiment of the invention includes a telescoping shaft 12 having a first end 14 and a second end 16. As may best be seen in FIG. 2, first end 14 is thicker and heavier than the second end 16 of telescoping shaft 12. Mirror assembly 10 further includes mounting structure 18 for mounting assembly 10 to a portion of a vehicle. In addition, telescoping shaft 12 is preferably constructed so that its respective components will not rotate relative to each other. In the preferred embodiment, mounting structure 18 is embodied as a suction cup 20 that is constructed and arranged to mount on to a window or windshield of the vehicle. As may best be seen in FIG. 2, suction cup 20 includes a relatively flat interior surface portion 22 that bears against the window or windshield of the vehicle when the suction cup 20 is adhered to the window or windshield. This has the effect of positionally stabilizing the suction cup 20. As may be seen in FIG. 2, a first adjustable joint 24 is provided for permitting positional adjustment between the suction cup 20 and the first end 14 of the telescoping shaft 12. First adjustable joint 24 preferably is formed by a socket that is defined within the suction cup 20 and a ball member 28 that is secured to the first end 14 of the telescoping shaft 12 and that is securely frictionally engaged within the socket 26. Suction cup 20 is preferably fabricated from a resilient elastomeric polymer material such as PVC.

Referring again to FIG. 1, a mirror housing 30 is attached to the second end 16 of telescoping shaft 12. Mirror housing 30 has a mirror 32 mounted therein and is connected to the second end 16 of the telescoping shaft 12 by means of a second adjustable joint 34, which in the preferred embodiment is a compound joint that is articulatable in two locations. The telescoping shaft permits retraction of the mirror 32 close to the window upon which it is mounted, so that it can be positioned substantially under or behind the rear view mirror of the automobile. In this position, it may be safely and conveniently adjusted by either the driver of the front seat passenger, and it will not obscure view of the road ahead through the windshield. Mirror 32 preferably provides a field of view that is sufficient for the driver or front seat passenger to view the entire rear seat of the automobile, including the space behind the driver.

As may be seen in FIG. 1, second adjustable joint 34 includes a first socket 36 that is connected to the second end 16 of the telescoping shaft 12 by means of a keyed joint 52 and a second socket 38 that is defined in the mirror housing 30. A frictional articulation member 40 includes a first ball member 41, a second ball member 43 and an integral shaft 45 connecting the first and second ball members 41, 43. In the preferred embodiment, second ball member 43 is larger than first ball member 41, whereby the connection between the first ball member 41 and the first socket 36 has less friction than the connection between the second ball member 43 and the second socket 38. Accordingly, during adjustment, the portion of the joint that is formed by the first ball member 41 and the first socket 36 will tend to move before the portion of the joint that is formed by the second ball member 43 and the second socket 38.

As may be seen in FIG. 1, a plunger 42 within the first socket 36 is urged against first ball member 41 by a spring member 44, thereby maintaining a predetermined amount of friction between the ball member 41 and the first socket 36. Similarly, a plunger 46 within the mirror housing 30 is urged against the second ball member 43 by a spring member 48 in order to ensure that second ball member 43 engages the second socket 38 with a predetermined amount of frictional resistance. A second, opposite end of the spring 48 is seated within a spring 50 within the mirror housing 30, as shown in FIG. 1. It will be apparent that the frictional articulated member 40 is assembled with the mirror housing 30 during manufacture by inserting the frictional articulated member 40 through the housing 30 to the position where it is shown in FIG. 1, wherein the plunger 46, spring 48 and spring 50 are secured prior to final assembly of the mirror housing 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A mirror for use in a vehicle, comprising:
   a telescoping shaft having a first end and a second end;
   mounting means connected to said first end of said telescoping shaft for mounting to a portion of a vehicle;
   a first adjustable joint for permitting positional adjustment between said mounting means and said first end of said telescoping shaft;
   a mirror connected to said second end of said telescoping shaft; and
   a second adjustable joint for permitting positional adjustment between said second end of said telescoping shaft and said mirror, said second adjustable joint comprising a first socket that is connected to said second end of said telescoping shaft, a second socket that is connected to said mirror, and a frictional articulation member having a first portion that is frictionally received in said first socket and a second portion that is frictionally received in said second socket.

2. A mirror for use in a vehicle according to claim 1, wherein said telescoping shaft is thinner at said second end than at said first end.

3. A mirror for use in a vehicle according to claim 1, wherein said telescoping shaft is constructed and arranged so that one end thereof is lighter than another end, and wherein said second end that is connected to said mirror is the lighter end.

4. A mirror for use in a vehicle according to claim 1, wherein said mounting means comprises a suction cup.

5. A mirror for use with a vehicle according to claim 4, wherein said suction cup comprises a relatively flat internal surface, whereby stability is enhanced when said suction cup is mounted to a surface of a vehicle.

6. A mirror for use in a vehicle according to claim 1, wherein said telescoping shaft is constructed and arranged so as to resist rotation.

7. A mirror for use in a vehicle according to claim 1, further comprising a housing for said mirror, and wherein said housing comprises at least one non gloss surface.

8. A mirror for use in a vehicle according to claim 1, further comprising a housing for said mirror, and wherein said housing comprises at least one gripping surface that is constructed and arranged to facilitate gripping of said housing by a user.

9. A mirror for use in a vehicle according to claim 8, wherein said gripping surface is fabricated from a material having a relatively high coefficient of friction.

10. A mirror for use in a vehicle according to claim 8, wherein said gripping surface is fabricated from a resilient elastomeric material.

11. A mirror for use in a vehicle according to claim 8, wherein said gripping surface is textured so as to enhance grippability.

* * * * *